Figure 1:
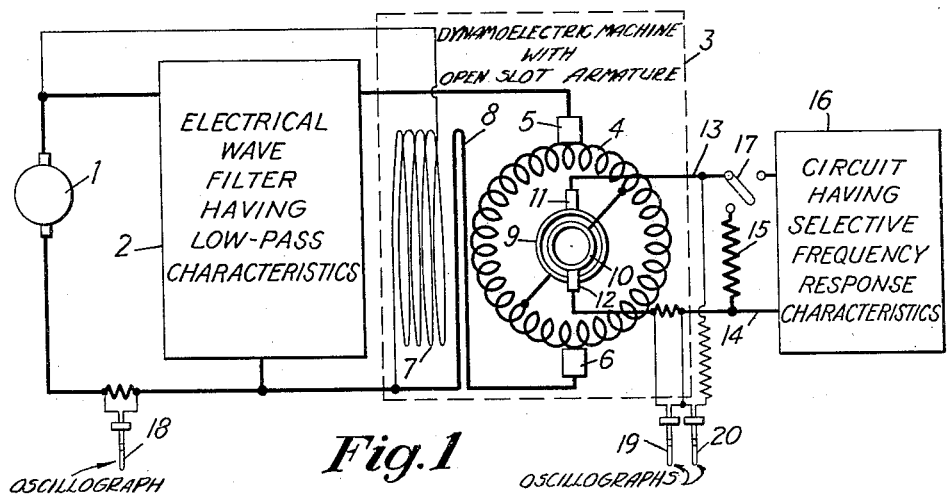

March 9, 1948. M. MORRISON 2,437,611

ELECTRIC MOTOR SPEED CONTROLLER

Filed Dec. 4, 1943 2 Sheets-Sheet 1

INVENTOR.
Mountford Morrison

March 9, 1948.  M. MORRISON  2,437,611
ELECTRIC MOTOR SPEED CONTROLLER
Filed Dec. 4, 1943  2 Sheets-Sheet 2

*Fig. 4*

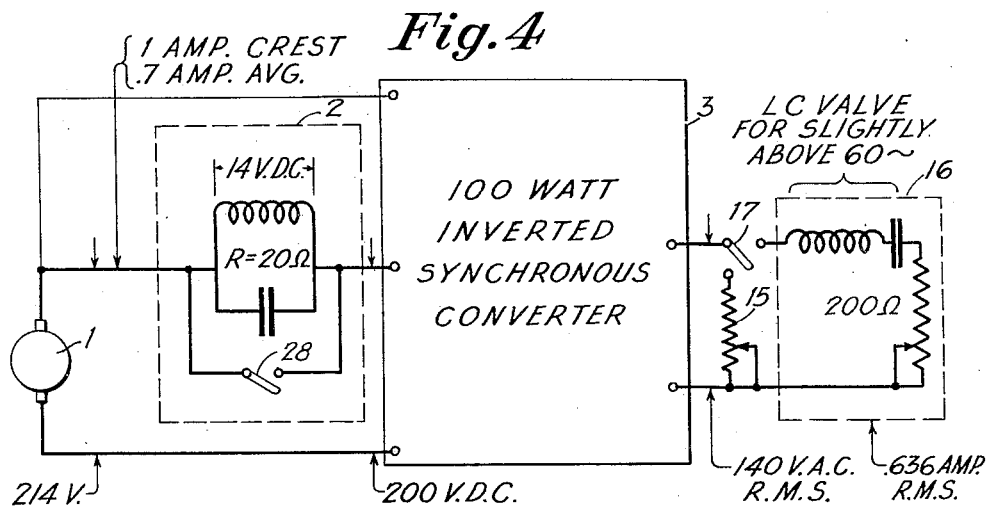

*Fig. 5*

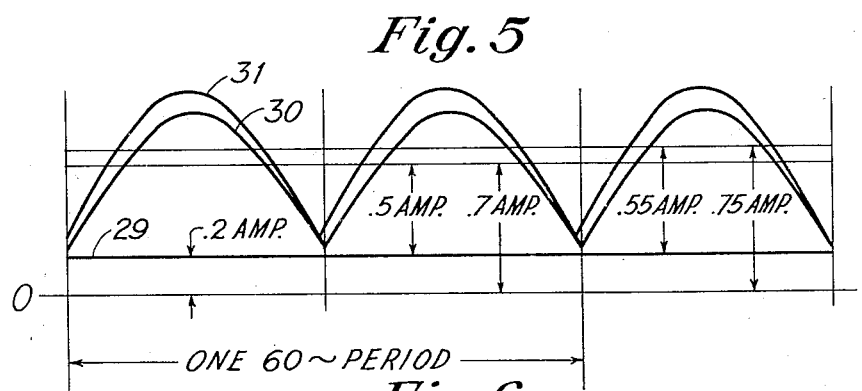

*Fig. 6*

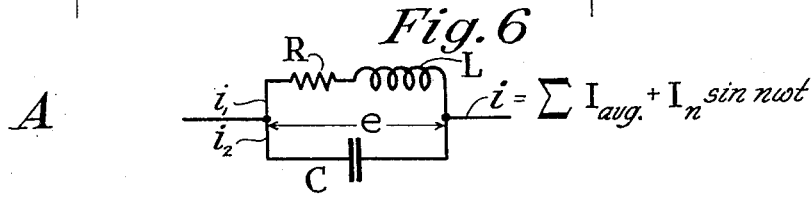

A  $i = \sum I_{avg.} + I_n \sin n\omega t$

B  $e = L\dfrac{di_1}{dt} + Ri_1 \;,\; C\dfrac{de}{dt} = i_2 \;,\; i_1 + i_2 = i$ C  $e = RI_{avg.} + \sum I_n \left(\dfrac{1}{Cn\omega}\dfrac{\sqrt{R^2 + L^2 n^2 \omega^2}}{\sqrt{R^2 + \left(\dfrac{1}{Cn\omega} - Ln\omega\right)^2}}\right) \cos\left[n\omega t + \tan^{-1}\dfrac{Ln\omega}{R} + \tan^{-1}\dfrac{\left(\dfrac{1}{Cn\omega} - Ln\omega\right)}{R}\right] +$ D  $C_1 \epsilon^{-\frac{t}{T_1}} + C_2 \epsilon^{-\frac{t}{T_2}}$ INVENTOR
Mountford Morrison Patented Mar. 9, 1948

2,437,611

UNITED STATES PATENT OFFICE 2,437,611

ELECTRIC MOTOR SPEED CONTROLLER

Montford Morrison, Upper Montclair, N. J.

Application December 4, 1943, Serial No. 512,896

7 Claims. (Cl. 171—123)

The present invention relates to electric motor speed controllers and in particular it relates to controllers for direct-current machines, and specifically relates to the speed control of inverted synchronous converters by electrical wave-filters.

Among the objects of the invention are; to provide an improved means and method to control the speed of small direct-current machines, to provide an improved means and method to fix the speed of such machines and hold the fixed speed at a comparatively high degree of constancy, to provide a means of control for such machines which is not highly sensitive to the copper temperature of the machine, and to provide such means to operate effectively and without the use of mechanical relays or other moving parts.

This invention is based upon a discovery in dynamo-electric machine theory of operation, which has not been published heretofore within the knowledge of the applicant and, therefore, this unpublished theory will be disclosed before its functioning in the invention is set forth.

In the commonly published theory of synchronous converters, the armature of the machine is assumed to operate as an equivalent motor-generator set with the exception that the synchronous converter, having only a single group of magnetic circuits instead of two groups, which latter structure represents the case in the motor-generator set.

Under this prior theory, when the synchronous converter is operating inverted, that is, receiving direct-current at the commutator end of the machine and delivering alternating-current at the slip ring end of the machine, the machine operates similar to an equivalent direct-current motor drawing constant direct-current from the power source, and by simple generator action, alternating-current is supplied from the slip rings.

In synchronous converters having a single armature winding with tapped points on this winding for the slip rings, the current in the armature coils is often and usually calculated by taking the difference between a constant current input assumed to enter the coils and an alternating-current output from the coils.

While this theory seems to provide useful design information for operating polyphase machines, I have discovered that the assumptions and theories which follow from them are entirely erroneous for single phase inverted synchronous converters and naturally for polyphase inverted synchronous converters operating single phase or with a badly unbalanced-phase load.

Figure 2:
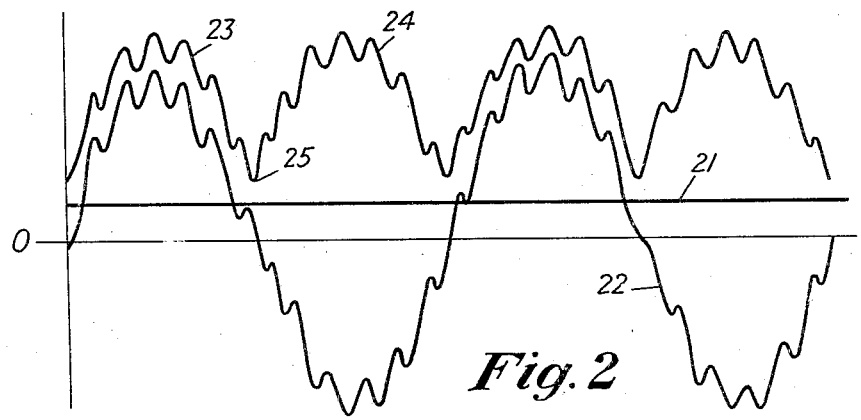
Figure 3:
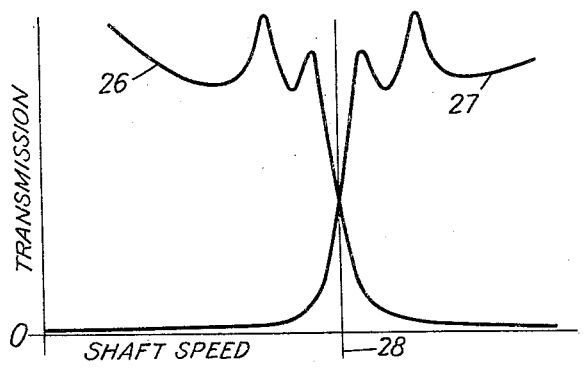

I have discovered that the single phase inverted synchronous converter operates in fact not as above outlined but much like the combination of a direct-current motor, a transformer and a rectifier, as will be more fully hereinafter set forth, and upon this discovery the present invention is based. The theory involved in the present invention as well as an embodiment thereof, can be best understood from a reading of a description hereunder, particularly when taking in connection with the drawings in which Fig. 1 is a circuit illustrating an embodiment of the invention, and Figs. 2 and 3 are curves useful in understanding the theory involved and the operation of the embodiment herein set forth, Fig. 4 is a specific example of an embodiment of my invention with data given as to size of converter, load and filters; Fig. 5 is a graph of input load currents created in the direct-current armature line circuit of the converter illustrated in Fig. 4, and Fig. 6 shows formulas for calculating the direct-current voltage drop across the input filter illustrated in Fig. 4.

Referring to Fig. 1, 1 is a source of direct-current; 2 is an electrical wave-filter, and the diagram enclosed in the dotted area identified by 3, is a dynamoelectric machine having a rotor 4 composed of, for purposes of illustration, a drum wound armature provided with a commutator, which commutator is assumed to be the peripheral edges of the coils in the conventional diagram illustrated, and the commutator is provided with brushes 5 and 6, a field coil 7 connected in shunt with source 1 and a series field coil 8. The structure of said dynamoelectric machine, in preferred form, is that of an inverted synchronous converter, which may be employed as an electric motor if and when desired, and therefore, may be referred to as a motor, when so employed. Slip rings 9 and 10 are tapped at diametrical positions of the rotor 4, as is conventional in engineering text. While the diagram illustrated is that for a two-pole machine, this type of illustration is employed for simplicity in teaching and is not limited to a two-pole machine, as is well understood by those skilled in the art.

Slip rings 9 and 10 are provided with brushes 11 and 12 supplying alternating-current to output leads 13 and 14. 15 is a resistor load which may be utilized, if and when desired, and 16 is an electrical network having selective frequency response characteristics and may be a simple circuit or a filter network, as the case may require. Switch 17 may be employed to connect resistor 15 to the load circuit of the inverted synchronous converter as well as may switch 17 be used to connect selective frequency response circuit 16 to that machine, as and when desired.

18 represents the vibrator of an electromagnetic oscillograph which may be used to measure and delineate the load current wave-form in the direct-current circuit of the machine. 19 is an oscillograph vibrator adjusted to delineate the alternating-current load wave-form of the machine, and 20 is an oscillograph vibrator adjusted to delineate the alternating-current output voltage wave-form of the machine.

The theory involved in the discovery above referred to can now be set forth.

Referring to Fig. 1, if the electrical wave-filter 2 is assumed to be out of the figure for the test and switch 17 is entirely open, that is, not connected to any load whatever, we then have a simple single phase compound inverted synchronous converter operating with an open load circuit from power supplied by a direct-current source. If a record is made of the load current by vibrator 18, there is produced a constant continuous current, as illustrated by the straight line 21, Fig. 2, and vibrator 20 will delineate the alternating output voltage which, in the present case, is an alternating-current with a pronounced tooth harmonic as the rotor 4 in the present embodiment is taken to be an open slot armature. Under these conditions, vibrator 20 may delineate a curve like that illustrated by 22, Fig. 2.

The reason for employing an open slot armature is two-fold. First, it more clearly illustrates the theory, and secondly, to make specific use of these tooth harmonics, as will be hereinafter fully set forth.

If switch 17 is closed onto the resistor 15 to produce considerable alternating-current load, the vibrator 18 will delineate a curve like 23, Fig. 2, and herein lies the discovery upon which the present invention is based.

Contrary to the common notion that the curve 21 would simply be raised to a higher value, I have discovered that the direct-current circuit follows the alternating-current circuit faithfully in proportion to the instantaneous demands of power from the alternating-current load, by transformer action, as is clearly illustrated in Fig. 2.

Of course, both alternating-current wave-lobes represent power and, therefore, the power-demand or instantaneous increases in power-demand, has to be supplied by increases of power from the direct-current circuit which is naturally by force of circumstances, uni-directional. This uni-directional power effect illustrated by lobes 23 and 24, Fig. 2, is, of course, physically brought about by the change in direction of the current in the coils when brushes 5 and 6, Fig. 1, are on the same corresponding brush positions represented by 11 and 12 at their respective armature taps.

Referring to Figure 2, it will be noted that the instantaneous power demand on the direct-current circuit, as illustrated by the lobes 23 and 24 of that figure, is never quite reduced to the no load current value 21 as shown at position 25, because under load the armature losses are greater at this point than under no load conditions, in spite of the fact that there may be no electrical output at this instance of time.

The faithful following of lobes 23 and 24, of the delineation of curve 22, is necessarily by transformer action. The reversal of lobe 24 is a rectifier effect caused by the reversal of current in the coils at or near the zero voltage position of the coils. The electric motor action is represented by a constant component of lobes 23 and 24 required to keep the machine at the proper speed of operation, which includes supplying some of the operating losses.

It is obvious that under conditions of loading such as above described, that any alternating-current impedance placed in the direct-current circuit of the machine shown in Fig. 1, will cause a reactive electrical voltage drop across this impedance. If an electrical impedance is included in this direct-current circuit which has a selective frequency characteristic, the voltage drop caused thereby in the direct-current input circuit can be made low for one frequency and high for another. If an electrical wave-filter is placed in this input circuit, the voltage drop across the wave-filter may be made highly selective with reference to frequency and very critical thereto, if and when desired.

If an electrical wave-filter having low-pass characteristics, such as that illustrated by curve 26, Fig. 3, is put into the block 2, Fig. 1, and the switch 17 closed onto the resistor 15 and the said filter represented by pass characteristics 26 be constructed such that at the shaft speed represented by the ordinate 28, Fig. 3, the characteristic 26 represents pass characteristics to the fundamental frequency component of curve 23—24, or to any substantial harmonic component thereof such as the tooth frequency, for instance, of the armature. Any increase in the shaft speed above that represented by ordinate 28 will tend to considerably reduce the input current from the direct-current source 1, Fig. 1, and therefore prevent the machine speed from increasing any substantial amount, thereby providing constant speed regulation for an inverted synchronous converter.

It may be well to say at this point that this method of speed regulation is intended preferably for very small machines of fractional horse power ratings.

While low-pass filters can be made to be critically responsive to the fundamental component of curves 23 and 24, much better critical characteristics may, in some cases, be obtained at lower cost, at higher frequencies and, therefore, it is desirable in some cases to develop high tooth harmonics, such as those illustrated in Fig. 2, and to build the filter 2, Fig. 1 responsive to these tooth harmonics as an optional embodiment.

Referring to Fig. 1, the responsive effect of filter 2 can in some cases be greatly increased by throwing switch 17 into a circuit having selective frequency response characteristics. This circuit 16 can be utilized to develop or magnify the fundamental component of curve 23—24 or any higher harmonic component thereof, and such a circuit is particularly useful in developing the tooth harmonic to such an amplitude that the filter 2 becomes greatly more sensitive to increased shaft speeds.

If circuit 16 has transmission characteristics such as illustrated by curve 27, Fig. 3, then as the shaft speed tends to increase the harmonic component of the output voltage of the inverted synchronous converter to which wave filter 26 responds, the stabilizing effect may be greatly magnified. In other words, an increase of shaft speed is accompanied by steep reduction of current in the input circuit but also by steep increase of the same harmonic in the load circuit, adding greatly to the speed stabilization of the machine.

A specific example will now be given of a practical size of converter, together with other data concerning load and filters embodying the applicant's invention, together with such theoretical disclosure as will be helpful in teaching those skilled in the art how to embody this invention in a practical device.

A 100-watt inverted synchronous converter will be taken for the specific example, although the applicant does not limit himself to this size machine, for in fact the curves shown in Fig. 2 are copies of oscillograms taken on a 3-kilowatt machine.

Referring to Fig. 4, 1 is the direct-current generator of Fig. 1; the circuit contained within dotted area 2 is the electrical wave filter having low-pass characteristics of Fig. 1; the block 3 represents a 100-watt inverted synchronous converter, the characteristics of which will be more fully disclosed hereinafter, and the circuit contained within the dotted area 16 is a circuit having selective frequency response characteristics as specified in Fig. 1. The other numerals of Fig. 4 represent equivalent elements identified by these numerals in Fig. 1.

The 100-watt synchronous converter of Fig. 3 is a 2-pole machine having a relatively large number of overhung or partially closed slots. These slots are skewed in the armature to eliminate armature tooth harmonics and the armature is wound with the closed drum winding brought out to a relatively large number of commutator bars, with diametrical taps for the collector rings as illustrated in Fig. 1. The poles of this machine are provided with tapered airgaps, all of which provides a very smooth and accurate sinusoidal voltage output without any obvious trace of tooth harmonics.

The machine is designed with a stiff shunt field so that the speed of the armature will not be sensitive to the phase angle of the alternating current load. The machine is provided with a series field which produces 20% accumulative compounding, that is, if the machine were operated as a direct-current motor without alternating-current load, the ampere turns of the series field would represent 20% of the ampere turns of the shunt field. This provides relatively heavy compounding and is a contributing factor to stability of the machine operation.

Referring to Fig. 4, the filter in circuit 2 comprises a so-called parallel resonant circuit having a resistance of 20 ohms and an impedance to applied frequencies, which will be set forth later. This parallel resonant circuit may be short-circuited by switch 28. The output circuit of the 100-watt inverted synchronous converter may be connected to a shunt resistance load 15 as in Fig. 1. The filter load circuit 16 is illustrated as a 200-ohm adjustable resistor in circuit with a so-called series resonant circuit having an LC value (L=henries, C=farads) providing resonance at a frequency slightly above 60 cycles. The synchronous converter operates at a 60-cycle output frequency and this series resonant circuit is operated at a point slightly below resonance, very close to the crest of the curve of load current resonance of this circuit. At this point the phase angle of the inverted synchronous converter load is very nearly unity. The load current is taken at substantially unity power factor to simplify the teaching of the invention, since in order to take into account leading and lagging power factor load, certain complications develop which tend to mask out the true nature of the invention by technicalities of synchronous converter operation. That is, a leading power factor load tends to slow up the speed of an inverted synchronous converter and a lagging power factor load tends to increase it, and therefore, if these effects were to be treated, this would unnecessarily complicate the teaching of the invention. Further, leading or lagging power factor loads tend to complicate the wave form of the direct-current input of the machine which involves further theory which tends to mask out the true nature of the invention. For these reasons, the current in the load circuit of the inverted synchronous converter under operation with filter circuit 16 connected to the output of the converter, is taken to be very nearly operating at unity power factor with only very slight shifts in the phase position of the current, as will be referred to hereinafter.

Referring to Fig. 4, if switch 28 is closed and switch 17 is in a position to include no alternating-current load, the machine operates as a compound, wound, direct-current motor. With the no-load armature loss taken at about 40 watts with 200 volts D. C. on the armature, this gives a no-load current of .2 amp., as shown in Fig. 5 by the straight line 29. This 40-watt armature loss represents the entire mechanical as well as magnetic losses due to the armature rotation and will represent the armature machine losses at full load with the exception of the additional copper losses due to load current. Taking this simplified viewpoint, the machine under electrical load does not change these losses greatly, as pointed out with reference to Fig. 2 and as illustrated in Fig. 5, hereinafter discussed.

With switch 28 closed, switch 17 is closed onto resistor 15, with the voltage remaining 200 at the armature input terminals. The resistor 15 is adjusted to give about .636 amp. A. C. R. M. S., the machine having an open circuit alternating-current voltage of about 140 R. M. S. An oscillogram taken on the armature load current at the location 19 of Fig. 1 will show a pure sinusoidal, rectified voltage wave such as illustrated by 30, Fig. 5, added to the .2 amp. no-load, plus a slight additional current representing the difference between the copper losses at no-load and full load.

This pure sinusoidal, rectified current 30 has no traces of tooth harmonics in it, but this load current is in fact a direct current having an alternating current superimposed upon it. The direct and alternating current components of this curve are well known and the formula for this curve is known to be $$i = I_{avg.} - I\left(\frac{1}{3}\cos 2\omega t + \frac{1}{15}\cos 4\omega t + \frac{1}{35}\cos 6\omega t + \cdots\right)$$

which may be written in an equivalent form $$i = \sum_{n=2}^{\infty} I_s + I_n \sin n\omega t,$$

where $n$ is an even integer.

The difference between the formula given above and that commonly found in the literature (see Starr "Electric Circuits and Wave Filters," Pitman 1943, page 334) is due to the extra-constant current that is added to the rectified sine waves of Fig. 5. In both cases the constant term represents the average current however, and in this respect the formulas are alike. In other words, the curve 30 is really made up of a constant current value represented by the average value of the lobes of this wave, plus alternating currents representing frequencies of 2, 4, 6, etc., times the fundamental 60-cycle frequency. Such a form of current as illustrated by the curve 30 will be reacted upon by a suitable filter, such as shown in the dotted lines 2, Fig. 4, due to the alternating-current components thereof, in the same way that similar alternating-current components would be reacted upon by the same filter in the absence of the direct-current component.

Further, when such a filter as illustrated in the dotted line, 2, Fig. 4, is subjected to a composite wave having both direct and alternating-current components, it reacts in a manner not directly disclosed anywhere in the literature known to the applicant and therefore he will describe the operation of this filter when subjected to such a composite current. This will be necessary to fully understand the operation of the input filter of Fig. 4 when subjected to input current such as 30, Fig. 5.

Referring to Fig. 6, the parallel resonant circuit of dotted area 2 of Fig. 4 is illustrated therein, and in which R is the resistance and L is the inductance of one branch of the divided circuit, and C is the capacity of the parallel branch. The current in the inductive branch is $i_1$, the current in the capacitive branch is $i_2$ and the voltage across the parallel circuit is $e$. The current in the line is $i$ which is the sum of the currents in the two branch circuits, which in this case may be represented by $$i = \sum_{n=2}^{\infty} I + I_n \sin n\omega t$$

where $n$ is an even integer and which equation is the harmonic analysis formula for the current 30 in Fig. 5 where $I_{avg.}$ is the average constant current, $I_n$ is the amplitude and $\sin n\omega t$ represents the harmonic frequencies of the components, all as shown along line A in the figure. Along line B is given the three equations between the currents and the voltage in this circuit.

If the three equations given along line B are combined and the harmonic analysis of the current $i$ given along line A, Fig. 6, is substituted for $i$ in the third equation along line B, it can be shown that the voltage across the parallel circuit, as a function of the line current $i$, is that given along lines C and D. This solution is given herein, since, to the best knowledge and belief of the applicant, it does not appear in this form in any publication, that is, an equation showing the instantaneous voltage across a parallel resonant circuit having a composite line current including both direct and alternating-current components, is not known to the applicant to appear in the literature.

The equation shown along lines C and D states that the instantaneous voltage is made up of a constant term represented by $RI_{avg.}$ plus the summation of a group of terms representing the harmonic components of the wave plus two transient terms.

Since the present case treats only with steady state conditions, the transient terms shown along line D have no necessary pertinency in the disclosure and may be eliminated therefrom. The terms within the square brackets in line C represent the phase angle of the resultant harmonic component in the voltage across the parallel resonant circuit, the terms in the large round brackets representing one of the coefficients of the cos, gives the impedance of the parallel resonant circuit to the particular frequency under consideration, and the other coefficient $I_n$, represents the original amplitude of the particular frequency under consideration.

The understanding of this equation of instantaneous current across the parallel impedance can be greatly further simplified by remembering that the phase angle of the harmonic components in this case are not as important as the amplitudes thereof so that if the amplitudes alone are considered, it will be observed that the instantaneous voltage drop across the parallel impedance is proportional to the resistance of the inductive branch of the circuit, multiplied by the average current, plus ripples superimposed upon this average current, having amplitudes depending upon the effectiveness of the parallel circuit impedance to reduce them.

However, the outstanding point to observe is that the average direct-current voltage drop across the parallel impedance is the product of the resistance and the average current and nothing else.

Referring to Fig. 4, this means that the average direct-current voltage drop across the parallel impedance within the dotted area 2 is a function of the alternating load current, when the switch 28 is open.

If the alternating load current is a function of the frequency, then the average direct-current voltage drop across the input filter 2 is proportional to the frequency. If the switch 17, Fig. 4, is closed onto a circuit in which the load current increases with a variation at a greater rate than the frequency, then the average direct-current voltage drop across the input filter 2 will tend to increase at a greater rate than the variation in the frequency. The average direct-current voltage drop across the filter 2 is the exact equivalent of putting that voltage in series with the synchronous converter armature, and therefore serves to regulate its speed by armature voltage control.

Referring to Fig. 5, it will be seen that if the speed of the machine tends to increase by reason of, for example, the shunt fields heating up, which always takes place in such converters, the resultant increased frequency, due to the reduction in the shunt field strength, will cause the filter load 16 to increase the load current with the same armature input voltage, from the curve 30 to a higher value, such as curve 31. This curve may shift slightly due to the current and voltage relations in the filter circuit 16, but, as heretofore set forth, this shift is supposed to be slight, such that the phase angle does not detrimentally interfere with the operation of the machine and does not cause detrimental D. C. line current distortion.

This increased current gives an increased average current due to frequency which alone, in the input direct-current circuit, raises the average voltage drop across the filter circuit 2 providing speed control and therefore frequency control for the synchronous converter, which shows that the filter in the dotted area 2 is responsive to the speed of the armature in the entire absence of tooth harmonics.

A large variety of modifications in the circuit arrangements, together with an almost endless number of modifications, may be made in the filter circuits without departing from the spirit of the invention. In fact, more suitable filters may be constructed than those called for in the specific example given, and these greatly simplified forms of filters are called for in this specific embodiment only to provide a clear and concise disclosure of the invention, which will enable those skilled in the arts involved to make and use other practical forms and structures embodying the invention.

Where fractional horse power constant speed motors are required, having a high order of constancy, this invention provides an improvement over anything found in prior art.

Having taught the theory of my discovery and having taught its application to an embodiment of this invention, the scope thereof is set forth in the claims hereunder.

What I claim is:

1. In a dynamoelectric machine, an inverted synchronous converter armature, an electrical wave-filter in the direct-current armature line circuit thereof, and said filter being in tuned electrical relation with the tooth-frequency of said armature to control the speed of said armature.

2. In combination, a dynamoelectric machine having a source of direct-current driving energy in the input circuit thereof, said machine having a structure causing an alternating-current component in the input current derived from said source and generating an alternating current in an electrical output circuit thereof, a selective attenuation electrical wave-filter responsive to said component in said input circuit, and an electrical wave-filter responsive to a predetermined frequency in said output circuit.

3. In combination, a direct current source, an inverted synchronous converter having an electrical wave-filter possessing low-pass characteristics in the input circuit thereof, and having an electrical wave-filter possessing high-pass characteristics in the output circuit thereof, whereby the speed of said converter is regulated by the alternating current pass-characteristics of said filters regulating the converter-driving energy received from said source.

4. In a dynamoelectric machine, an armature driven by a direct current having an alternating-current component in said direct-current of a frequency proportional to the speed of said armature, and alternating-current circuit means in the direct-current armature line circuit reducing said direct-current with increasing speed of said armature.

5. In a dynamoelectric machine, an inverted synchronous converter armature, and an electrical wave-filter in the direct-current armature line circuit thereof, coupled with an electrical wave-filter in the alternating-current line circuit thereof, controlling the speed of said armature.

6. In combination, a dynamoelectric machine in circuit with a source of direct-current driving energy, and included in said circuit a selective attenuation electrical wave-filter having characteristics reducing the driving current of said dynamoelectric machine, with increasing speed thereof.

7. In combination, a dynamoelectric machine in circuit with a source of direct-current driving energy, said machine having a structure causing an alternating current component in the driving current derived from said source, and included in said circuit a selective attenuation electrical wave-filter having characteristics reducing said driving energy with increasing frequency of said component.

MONTFORD MORRISON.

REFERENCES CITED

The following references are of record in the file of this patent:

UNITED STATES PATENTS

| Number | Name | Date |
| --- | --- | --- |
| 546,191 | Rice | Sept. 10, 1895 |
| 620,336 | Lamme | Feb. 28, 1899 |
| 687,140 | Everest | Nov. 19, 1901 |
| 713,010 | Lunt | Nov. 4, 1902 |
| 1,408,040 | St. Clair | Feb. 28, 1922 |
| 1,976,581 | Rose | Oct. 9, 1934 |
| 2,047,912 | Theremin | July 14, 1936 |
| 2,059,738 | McCurdy | Nov. 3, 1936 |
| 2,217,478 | Gulliksen | Oct. 8, 1940 |
| 2,395,246 | Bousky | Feb. 19, 1946 |

FOREIGN PATENTS

| Number | Country | Date |
| --- | --- | --- |
| 431,401 | Great Britain | July 8, 1935 |